July 16, 1957     F. D. BUTLER     2,799,182
PRESSURE VARIABLE RATIO COMBINED HYDRODYNAMICAL
AND COMPOUNDED PLANETARY TRANSMISSION
Filed Sept. 21, 1956     3 Sheets-Sheet 3
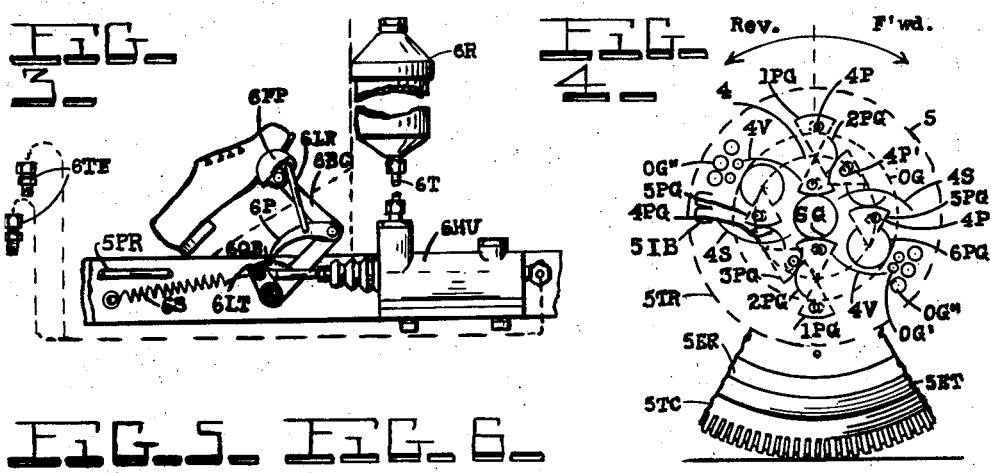
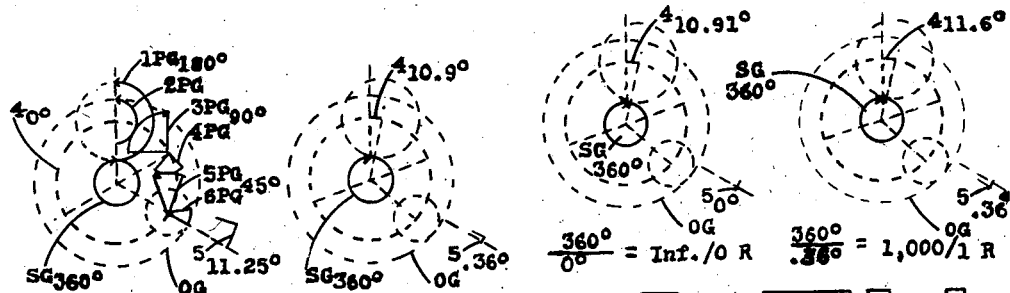
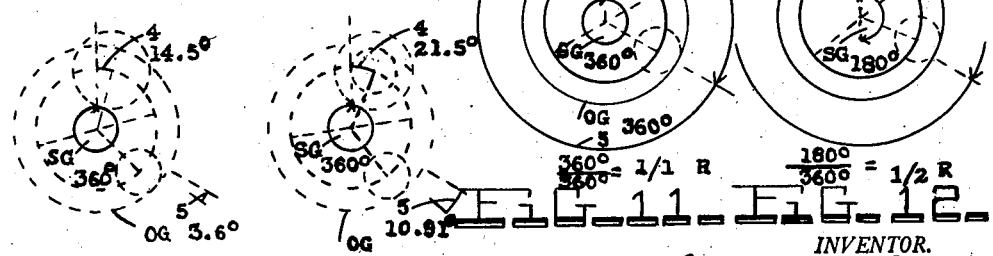
INVENTOR.
Frank David Butler United States Patent Office 2,799,182
Patented July 16, 1957

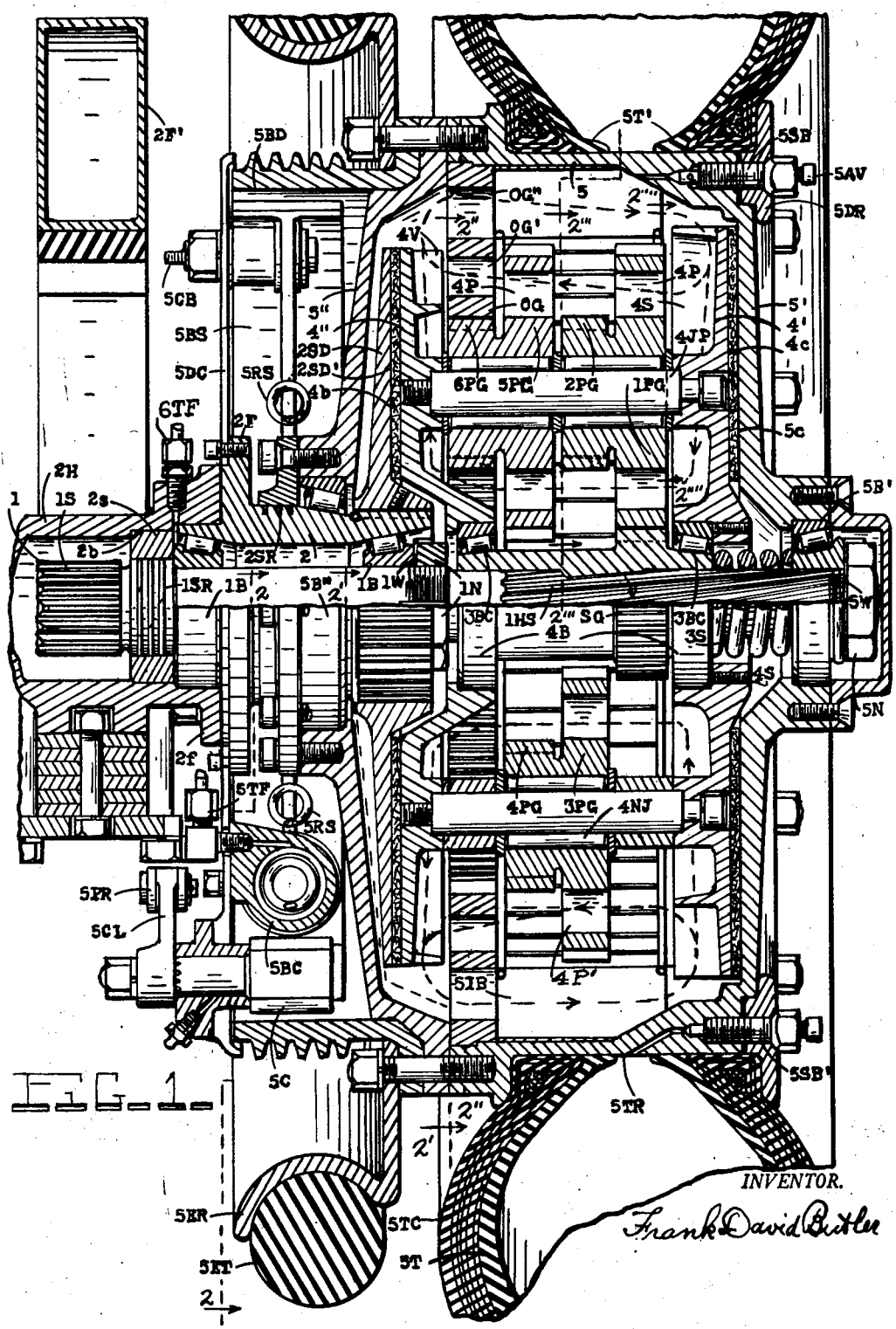

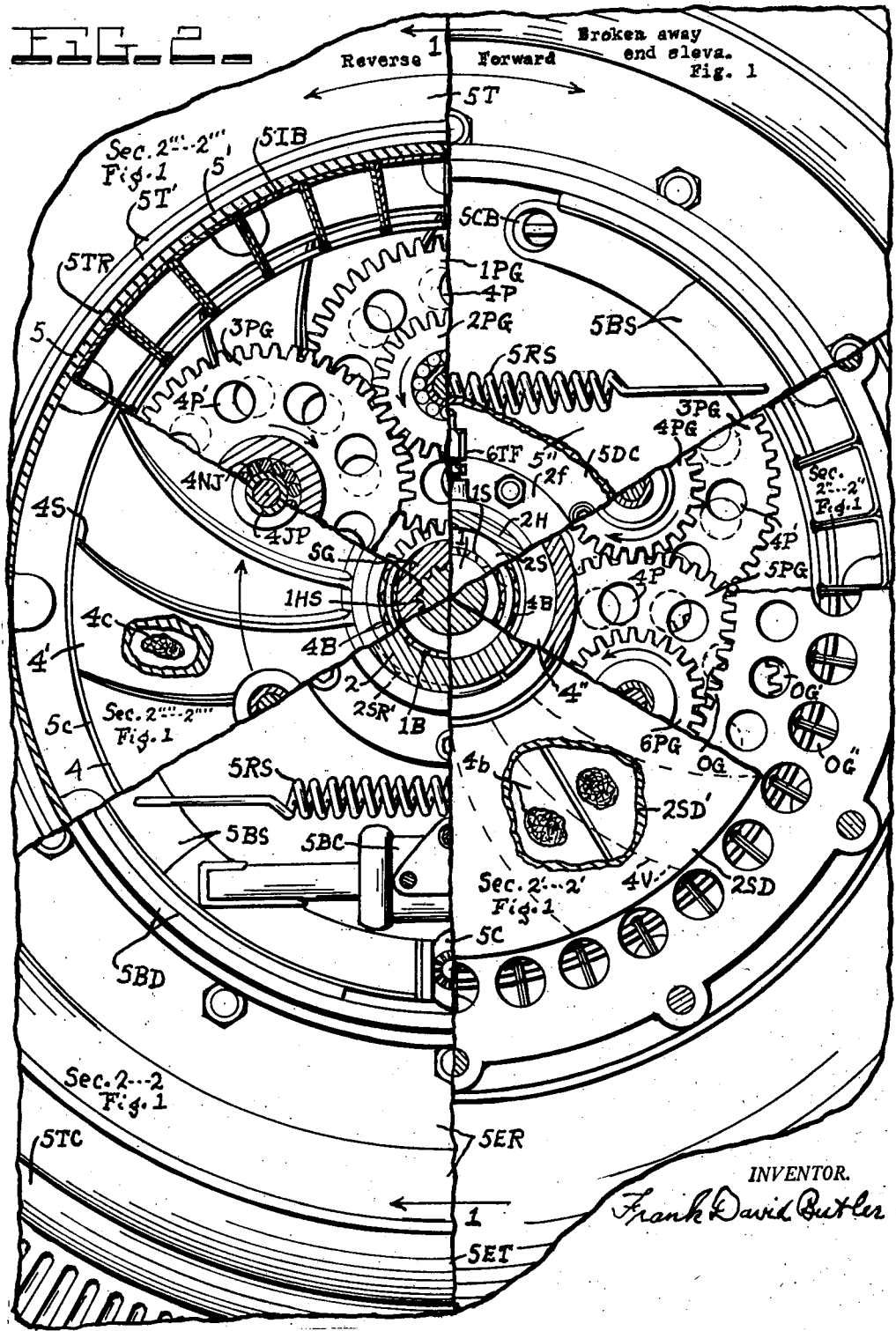

2,799,182
PRESSURE VARIABLE RATIO COMBINED HYDRODYNAMICAL AND COMPOUNDED PLANETARY TRANSMISSION

Frank David Butler, Venice, Calif.

Application September 21, 1956, Serial No. 611,392

22 Claims. (Cl. 74—677)

While my invention relates in general to combined hydrodynamical and compounded planetary gearing driven, internal fluid pressure variable and reversible transmission couplers wherein each is adaptable in forming the hub proper of a traction wheel of an automotive vehicle, it relates more particularly to detail improvements in such type of couplers.

This present invention is an improvement over my previously patented couplers, U. S. Patent No. 2,775,909, January 1, 1957, copies of which are obtainable through the U. S. Patent Office.

The major improvements in this present coupler relate to relatively simple means, as applied to subject type of couplers, for: quadruple compounding the planetary gearing thereof; providing each, of a series of relatively large diameter planet-gears thereof, with a row of series of through diagonally axially extending fluid impelling passages for inducing fluid from adjacent a larger diameter clutchable end of the planet-gear-carrier and discharging it to adjacent a smaller diameter brakable end of this carrier and thereby to axially displace the latter and to clutch it against a driven member automatically and normally progressively hydrodynamically; providing a row of series of radially extending concaved shaped fluid induction scoops internal to the larger diameter end of said planet-gear-carrier adjacent the induction ends of said series of fluid impelling passages and for fluid circulating purposes; providing a row of series of radially extending convexed shaped fluid impelling vanes internal to the smaller diameter end of said planet-gear-carrier adjacent the discharge ends of said series of fluid impelling passages and for fluid circulating purposes; providing said driven member with a row of series of elongated axially extending impelled buckets located in the interior of the periphery thereof and initiating adjacent an orbit-gear, carried by said driven member, and terminating adjacent the outer ends of said series of fluid induction scoops and for fluid circulating purposes; providing said orbit-gear with a row of series of axially extending fluid impelled passages extending through such orbit-gear and providing cooperative communication between the discharge ends of said series of fluid impelling passages and said row of series of fluid impelling vanes; and, a second row of axially extending fluid impelled passages located outward from the first one mentioned and extending through said orbit-gear and forming cooperative communication between the outer ends of said radially extending fluid impelling vanes and said row of series of fluid impelled buckets in said driven member.

Other minor improvements for relatively simplifying subject type of couplers will appear as the specification progresses.

With reference to the figures of the drawings: Fig. 1 is a longitudinal section through my present coupler as may be provided with three sets of quadruple compounding gearing, and as such coupler would appear on the dotted and broken line 1—1 of Fig. 2; the latter figure is jointly in side elevation and a series of transverse sections of the coupler in Fig. 1, with the upper right 60° as a broken away side and/or end elevation from the left side of Fig. 1, the lower left 60° as taken on the dotted and broken line 2—2 of Fig. 1, the lower right 60° as on the dotted line 2'—2', the right middle 60° as on the dotted line 2"—2", the upper left 60° as on the dotted line 2'''—2''', and the middle left 60° as on the dotted line 2''''—2'''' of said Fig. 1; Fig. 3 illustrates a manually operable master hydraulic-cylinder means for applying a variable hydraulic fluid pressure to each coupler assembly; Fig. 4 is a diagrammatic sketch of the preferred arrangement of method of quadruple compounding the coupler with three series of opposite pairs of tandem large and small diameter reduction planet-gears, with the first opposite pairs of the series at 0° and 180°, the second opposite pairs at 60° and 240°, and the third opposite pairs at 120° and 300°, and wherein the larger diameter gears of the first opposite pairs mesh with the sun-gear and the smaller diameter gears of the third opposite pairs mesh with the orbit-gear, and the latter normally rotates in the same direction as said sun-gear; and, Figs. 5 to 12 are diagrammatic sketches which indicate the relative rotation of the sun-gear, the planet-gear-carrier and the orbit-gear under various conditions of coupler operation.

Inasmuch as hydrodynamic pertains to a fluid placed under kinetic pressure dynamically, normally through the rotation of a closed receptacle containing such fluid. Thus, during the rotation of the hydrodynamic coupler, a progressive hydrodynamic pressure is generated therein, and which pressure may simultaneously be below atmospheric pressure along the axis of rotation while at a relatively high pressure close to the periphery of such coupler, and wherein the latter such pressure is exerted equally axially and radially at any given point therein such coupler.

While the quadruple compounding of the planetary gearing of the coupler is a matter of choice as to gearing ratio used, the gearing ratio illustrated is 32 revolutions of the sun-gear to one revolution of the orbit-gear in reverse with the planet-gear-carrier stopped. However it actually requires 33 revolutions of the sun-gear to idly rotate the planet-gear-carrier through 360° of arc around it, while the orbit-gear is stopped, and the formula for this idling rotation is therefore; one ÷ (gearing ratio plus one), and in this case is equal to $1/33$. While the rotation of such planet-gear-carrier with the orbit-gear-carrier, with the sun-gear stopped, is; gearing ratio ÷ (gearing ratio plus one), and in this case is equal to $32/33$. Thus it can be seen, as the orbit-gear progressively increases in speed that eventually the rotative speeds of the sun-gear, planet-gear-carrier, and orbit gear will become synchronized into a one to one gearing ratio, as the torque load is decreased, and vice versa as such torque load is increased.

With reference to the drawings, similar letters and numerals indicate similar parts in the several figures and sketches, the numeral 1 indicates an elongated one direction rotatable axle-shaft that may be helically splined externally and may be preferably driven by an internal combustion turbine motive power assembly forming a part of the axle-shaft housing 2H and provided with at least one reduction gearing means coupled to said shaft 1. The latter is rotatively journalled concentrically within the elongated flanged tubular stator member 2 upon the opposed pair of adjustable tapering roller bearings 1B provided with the tongued locking washer 1W and adjustment nut 1N.

A series of piston-ring-type of non-rotative fluid seal rings 1SR are provided for preventing fluid leakage from the coupler along the shaft 1, and each such ring fits within a suitable groove, within an enlarged portion of shaft 1, at a location within a heat-treated sleeve 2s which latter is pressed into the bore 2b of the flanged portion 2f of said axle-shaft housing 2H. The shaft 1 is provided with a straight spline 1S, at the housing 2H end of the coupler, at which location it may be slidably connected to the motive power means. The shaft may also be provided with an elongated helical spline 1HS, adjacent its opposite end, over which the elongated internally splined sun-gear SG is slidable axially and coaxially rotatable therewith such shaft. The sun-gear SG is provided with a pair of integral opposed roller bearing cones 3BC, with one located on each side of the gear proper thereof, which cones form journals for the pair of opposed tapering roller bearings 4B which latter rotatively support the planet-gear-carrier 4 astride of such sun-gear and are slidable axially and rotatable coaxially therewith.

The planet-gear-carrier 4 is of a halved type combined as forming the coupler fluid impeller and intermediate and hydrodynamical driving member of such coupler rotatable concentrically with said shaft 1, and where in such carrier a series of symetrically spaced socket-head type of screws 4s are provided in a hub portion thereof for adjusting said roller bearings 4B.

The split type of annular shaped combined orbit-gear-carrier, closed fluid receptacle casing and wheel rim and hub 5, forms the gearing and hydrodynamically driven member of the coupler and is rotatively journalled upon two opposed tapering roller bearings 5B' and 5B" provided with a tongued locking washer 5W and an adjacent adjustment nut 5N. This driven member 5 is rotatively supported in a semi-full-floating manner as its outer half 5' is journalled on the roller bearing 5B' which is supported upon the shaft 1, while the inner half 5" is journalled on the roller bearing 5B" which has its bearing cone integral with said tubular stator member 2.

An elongated resilient type of coil spring 3S is supported upon said shaft 1 between said sun-gear SG and the cone of the roller bearing 5B' and provides said sun-gear SG and intermediate member 4 with an initial axial displacement towards and brakes the latter against the stator-disc 2SD, which latter is splined onto the coupler end of said tubular stator member 2.

In general construction the stator member 2 is provided with: a flange 2F at one end thereof which is bolted to and has a rabbet joint with the adjacent flanged end 2f of the axle-housing 2H; an elongated tubular portion integral with said flange 2F and provided to project concentrically within said driven member 5 a predetermined distance and to form the cups of said pair of roller bearings 1B and the cone for said roller bearing 5B"; a series of piston ring grooves located in the periphery of said tubular portion intermediate to said flange 2F and said bearing 5B" and within which grooves a similar series of piston rings 2SR are provided for preventing fluid leakage along said periphery of 2 to external to the coupler; and, a cylindrical splined portion adjacent its coupler end over which said stator-disc 2SD is a press-fit.

The general construction of the split type planet-gear-carrier 4 includes the provision therein and therewith of: a flanged annular shaped outer half 4' of relatively large diameter and provided with a bonded fibrous clutching surface 4c for contacting an adjacent clutching surface 5c internal to the outer end 5' of the driven member 5; a series of symmetrically spaced bosses for supporting the ends of each of the planet-gear journal pins 4JP; a row of series of radially extending concaved shaped fluid induction scoops 4S located internal to the clutching surface end of the half 4' and provided for inducing fluid inward radially; a flanged annular shaped inner half 4", of slightly less diameter than the outer half 4' and provided with a bonded fibrous braking surface 4b for contacting the adjacent braking surface 2SD' of said stator-disc 2SD; a row of series of radially extending convex shaped fluid impelling vanes 4V located internal to the braking surface end of the half 4" and provided for discharging fluid outward radially; a series of similar tandem pairs of relatively large and small diameter reduction planet-gears which are symmetrically spaced within such planet-gear-carrier and rotatively supported each pair upon one of said journal pins 4JP upon their respective series of needle journals 4NJ, and wherein such planet-gears, as illustrated in Figs. 1 and 2, may consist of a first series of three of such tandem pairs of reduction planet-gears located 120° apart in said planet-gear-carrier and having their larger diameter planet-gears 1PG each meshing with said sun-gear SG and their smaller diameter planet-gears 2PG meshing with the larger diameter planet-gears 3PG of a second series of three of such tandem pairs of planet-gears and which second series are also located 120° apart midway between the first series of three of such gears, and wherein the smaller diameter gears 4PG of this second series mesh with the larger diameter gears 5PG of a third series of three of these reduction planet-gears which are rotatable concentrically each pair with a pair of each of the first series of three of such gears, and, wherein the smaller diameter gears 6PG of this third series of reduction planet-gears mesh with the orbit-gear OG, and wherein the latter normally rotates in the same direction as said sun-gear; and, means for axially sliding said planet-gear-carrier with said sun-gear SG by and through mounting the former astride of the latter upon said roller bearings 4B.

In lieu of the coupler being provided with three pairs of said tandem pairs of reduction planet-gears in each series as previously described, it is preferably provided with two tandem pairs of such reduction planet-gears in each of the three series of same, and each two tandem pairs of each series, as illustrated in the diagrammatic sketch Fig. 4, are located 180° apart, with the first two tandem pairs located at 0° and 180° and the larger diameter gears 1PG meshing with sun-gear SG, with the second two tandem pairs located at 60° and 240°, with the third two tandem pairs located at 120° and 300° and their smaller diameter gears 6PG meshing with the orbit-gear OG, and, wherein the latter normally rotates in the same direction as said sun-gear.

In order to utilize the relatively numerous reduction planet-gears as a means of producing hydrodynamic axial fluid flow, within the planet-gear carrier, all of the larger diameter planet-gears 1PG, 3PG and 5PG of such tandem pairs are each provided with a row of series of through diagonally axially extending fluid impelling passages, which latter each, during the normal rotation of their respective planet-gears, induce fluid from adjacent the larger diameter end of carrier 4 and discharge it to adjacent the smaller diameter brakable end of this carrier. Inasmuch as the reduction planet-gears 1PG and 5PG normally rotate oppositely to the direction of rotation of the sun-gear SG, these gears are made identical to one another as they have the fluid impelling passages 4P extending diagonally in one direction, while the gears 3PG have their fluid impelling passages 4P' extending diagonally in the opposite direction, due to their respective planet-gears 3PG rotating in the same direction as sun-gear SG. During the normal forward rotation of the planet-gear-carrier 4, and to the relatively numerous reduction planet-gears, an inherent mass rotation of the fluid within the coupler results.

In order to utilize the relatively large diameter internally toothed orbit-gear OG, as a means of assisting in rotating its carrier 5 by and through hydrodynamic fluid flow within the coupler, this gear is provided with an inner row of series of substantially axially extending through fluid impelled passages OG' which, during the rotation of carriers 4 and 5, form cooperative communication between the discharge ends of said fluid impelling passages 4P and 4P' and said row of vanes 4V, while an outer row of series of similar axially extending through fluid impelled passages OG" form cooperative communication between the row of fluid impelling vanes 4V and an adjacent row of series of axially extending fluid impelled buckets 5IB, which latter are assembled as a fabricated unit and then pressed into the driven member 5, and extend from adjacent said orbit-gear OG to adjacent the outer ends of the fluid induction scoops 4S.

During the normal forward motion rotation of the coupler, the fluid is circulated hydrodynamically therein and its flow is as follows: the row of scoops 4S induce the fluid inward radially from the adjacent ends of the row of impelled buckets 5IB, adjacent the larger diameter clutchable end of the carrier 4, and discharge such fluid into the adjacent induction ends of the diagonally axially extending fluid impelling passages 4P and 4P', from whence such fluid is discharged at the opposite ends of these passages through the inner row of impelled passages OG', also directly into the row of fluid impelling vanes 4V, thence from the outer ends of the latter through the outer row of through fluid impelled passages OG'' into the adjacent ends of said row of series of fluid impelled buckets 5IB, and thence through such buckets to, the point of starting, adjacent the outer ends of said row of fluid induction scoops 4S.

At rotative speeds of and below idling speed of the motive power means, the planet-gear-carrier 4 is retained axially displaced, to the left Fig. 1, and slightly braked initially against the braking surface 2SD' of the stator-disc 2SD at the smaller diameter end of such carrier 4, thus if any manually controllable, externally supplyable, variable fluid pressure is applied at such time, it would tend to bolster the resilient springs 3S in initially retaining said carrier 4 so braked against stator-disc 2SD and would reinforce such braking and cause the carrier 4 to either slow down in its rotation and/or to stop rotating altogether, and in either case would result in the variable reverse rotation of the carrier 5. However if the carrier 4 is rotating at above idling speed of the motive power means, then a combination of means including the helix angle of the spline 1HS driving the sungear SG, the hydrodynamic fluid pressure being generated within the coupler acting upon the differential end areas of the carrier 4, formed by the difference in end diameters of the latter, and, the progressive clutching of the carrier 4 against the carrier 5, all tend to axially displace the carrier 4 to the right Fig. 1, to overcome the tension of the spring 3S and to clutch and thereby to tend to synchronize the forward motion rotation of such carriers 4 and 5. Any variable fluid pressure applied at such time will tend to bolster such clutching and will accelerate such synchronization of the rotation of such carriers.

With reference to the diagrammatic sketch Fig. 3, a manually operable means is illustrated for supplying and applying fluid under a variable pressure to a pair of oppositely located couplers, and such means comprises: a vented reservoir 6R preferably located at a relatively high level so as to provide a static head pressure upon the reserve fluid supply; a common master hydraulic, brake-cylinder type of, manually operable hydraulic pressure unit 6HU connected to reservoir 6R with the tubing connection 6T and to the two couplers via the tubing and fitting connections 6TF, and which hydraulic unit is variably operable through the oscillation of the bell-crank 6BC which latter is pivoted in the quadrant bracket 6QB which latter is provided with a series of latching teeth 6LT; a tiltable foot-pedal 6FP pivoted to the end of crank 6BC and forming means through which to latch the latter in any position through the link-rod 6LR and latching pawl 6P; and, a resilient coil type spring 6S for retracting the crank 6BC.

Inasmuch as the couplers cannot be manually placed into a lower gearing ratio while the automotive vehicle, equipped with two oppositely located couplers of this type, is descending a grade, it is essential that this coupler be provided with a relatively large ample braking means forming a part of the driven member and hub proper of the traction wheel of such vehicle, and that such braking means preferably be jointly operable hydraulically and mechanically. With reference to Figs. 1 and 2, each coupler is therefore provided with the following braking means jointly operative hydraulically and mechanically: a brake-drum 5BD forming a part of the driven member half 5'' and rotatable therewith; a pair of halved type brake shoes 5BS anchored at the cam-bolts 5CB and operative jointly by the hydraulic brake-cylinder unit 5BC and mechanically operative cam 5C; a pair of retracting springs 5RS for 5BS; and, wherein the latter may be jointly operable by a master hydraulic unit similar to 6HU, Fig. 4, excepting having a pull-rod 5PR which is pivoted to bell-crank at one and to the lever 5CL, of cam 5C, at its opposite end.

As a matter of convenience the coupler is provided with an air venting valve 5AV, threaded into one of the tire rim stud-bolts 5SB, and is also provided with an oppositely located, but not illustrated, similar drain valve, and, is further provided with a special stud-bolt 5SB' through which to either inflate or deflate the traction wheel tire casing 5TC and tube 5T. The latter is of a puncture proof type and is purposely left open along its inner surface so as to pressure seal along the adjacent flaps 5T' against the outer periphery of the tire rim 5TR. The latter forms a part of the driven member 5 as does also the emergency tire rim 5ER, which latter is provided with a solid elastic tire 5ET for preventing damage to 5TC in case of blowout of other deflation of same. The tire casing 5TC can be replaced with a spare without dismantling the coupler by removing the detachable rim 5DR. The dust cover 5DC, of the brake-drum 5BD, is halved, so that with the car frame 2F'' jacked up, such cover may be loosened and then rotated so that the halves may be removed inward above the housing 2H for relining the brake-shoe halves 5BS without disturbing the coupler proper.

In this particular type of coupler wherein a total of six planet-gear journal pins 4JP are used and are spaced 60° apart in the carrier 4, and wherein each reduction planet-gear consists of a relatively large and small planet-gear in a tandem pair, the following is very important: first, the teeth of all the planetary gearing must be divisible by six; second, the first two teeth machined in each large gear should straddle axially and aline with the first tooth machined in its mate small gear; and, all gears must mesh and rotate freely when assembled together. While there are more reduction planet-gears used in example Figs. 1 and 2 than there are in example Fig. 4, both such examples employ quadruple compounding of the planetary gearing and may each be converted to the other type by re-arrangement of the planet-gears upon the pins 4JP and either increasing or decreasing the numbers of such gears required in making such shift. For example of relative size etc. of gearing to use, for either a 15 or 16 inch tire rim as used on modern vehicles the gears could all be of 10 diametral pitch, with 24 teeth on the sun-gear and each small planet-gear 2PG, 4PG and 6PG, with 48 teeth on each large planet-gear 1PG, 3PG and 5PG, and, wherein the orbit-gear OG would then have 9.6 inch pitch diameter and would have 96 teeth. Thus in such coupler, under full reverse conditions of operation, the sun-gear would rotate 32 revolutions forward to one revolution in reverse of the orbit-gear OG, with the planet-gear-carrier 4 stopped, and as illustrated in Fig. 5.

The clutching surface and braking surface linings 4c and 4b respectively, of the planet-gear-carrier 4, may each be divided into quadrant shapes so as to provide fluid circulating slots extending radially between adjacent of such quadrants, as illustrated in Fig. 2.

As illustrated in Fig. 2 and by the dotted lines in Fig. 1, the orbit-gear OG may be provided with a flanged periphery. To dismantle the coupler in place, it must first be drained, then remove hub-cap and assembly 5N, 5W and 5B', then the row of nuts holding 5' and 5'' together, and, then slide 5', 4 and OG off of shaft 1 as an assembly.

This coupler assembly may be driven by my combustion turbine, motive power assembly, U. S. Patent No. 2,746,248, issued May 22, 1956, which forms a part of an axle-shaft housing such as 2H, and in such case a complete assembly of such motive power means and including both coupler wheel assemblies could be carried by major garages as a complete replacement assembly. Thus, such complete assembly could be rolled either in or out from under a vehicle upon the coupler wheel assemblies and this would simplify such replacement operation.

Inasmuch as the progressive clutching of the carrier 4 against the carrier 5 tends to progressively synchronize the rotation of these two carriers, as combined with the helical spline 1HS means and the hydrodynamical fluid flow and pressure producing means of the coupler which tend to actuate such clutching and as further bolstered in such actuation by said variable fluid pressure means, thus reduces the otherwise relatively large capacity fluid impelling means necessary to cause such synchronization of such two carriers. Though this coupler is provided with quadruple compounded planet-gearing for relatively heavy starting torque purposes, as combined with such a clutching combination means, it would still retain relatively fast acceleration by accelerating such clutching by fluid pressure application.

Due to the relatively large quantity of fluid carried in each coupler and the weight of the numerous reduction planet gears used, each coupler, during its rotation, sets up a progressive gyroscopic force which tends to keep the wheels rolling and makes ample braking power a necessary item to be considered in such combination.

Having fully described my transmission coupler, I claim:

1. In a combined hydrodynamical and compounded planetary gearing driven, externally manually controllable, fluid pressure variable and reversible transmission coupler equipped with; an internally splined, elongated, one direction rotatable, shaft mounted, axially slidable and coaxially rotatable sun-gear forming the gearing driving member; an elongated halved type of coaxially slidable and rotatable combined fluid impeller and planet-gear-carrier forming the hydrodynamical driving and intermediate member; an annular shaped elongated halved type of concentrically rotatable multi-bucketed combined closed fluid receptacle casing, orbit-gear-carrier and traction wheel hub forming the gearing and hydrodynamically driven member and provided with a closed end provided with a clutching surface therein; an elongated flanged tubular stator member projecting a predetermined distance concentrically within said driven member and upon and within which respectively said driven member and said shaft are concentrically rotatively journalled; an annular shaped flanged stator-disc secured over the coupler end of said stator member and provided with a braking surface on one side thereof; an elongated resilient coil spring mounted over said shaft and providing said planet-gear-carrier with an initial axial displacement against said stator-disc braking surface preliminary to reversing said driven member; a pair of matching elongated axially extending helical splines with one integral externally to said shaft and the other integral internally to said sun-gear; a combined means for progressively clutching said carriers together and synchronizing their normal forward rotation; an orbit-gear secured to and carried by said orbit-gear-carrier; a series of symmetrically spaced compounded planet-gears rotatable in and carried by said planet-gear carrier and having at least one gear meshing with said sun-gear and one gear meshing with said orbit-gear; and, a variable fluid pressure means operable manually externally and applicable internally to such coupler for controlling the forward and reverse rotation of the driven member thereof, the provision therein and therewith of: means for quadruple compounding the planetary gearing of, as combined with means for producing hydraulic fluid circulation flow within, such coupler, comprising; said sun-gear which is normally of relatively small diameter and forms the driving and first member of the quadruple compounding reduction gearing, and which sun-gear may be meshable with the larger diameter gears of a series of three, of a series of similar tandem pairs of relatively large and small diameter reduction planet-gears, and which first three pairs may be symmetrically spaced 120° apart and coaxially rotatable within said planet-gear-carrier and provided with the smaller gear of each pair meshable with the larger gear of each of a second series of three, of such similar tandem pairs of reduction planet-gears, which are symmetrically spaced midway between the first three pairs and similarly rotatable in and carried by said planet-gear-carrier and provided with the smaller gear of each pair meshable with the larger gear of each pair of a third series of three, of such similar tandem pairs of reduction planet-gears, and which third series are concentrically rotatable one pair with each pair of the first series of three, and wherein the smaller gear of each pair of the third series of three, of such similar tandem pairs of reduction planet-gears, is provided to mesh with said orbit-gear which latter is normally of relatively large diameter and forms the driven and last member of such quadruple compounded reduction gearing, and which orbit-gear normally rotates in the same direction as said shaft and said sun-gear; and wherein each of the larger diameter gears of each of such tandem pairs of reduction planet-gears is provided with a series of through diagonally axially extending fluid impelling passages which latter, during the rotation of such planet-gears, are each provided to induce fluid from adjacent a relatively large diameter clutchable end of said planet-gear-carrier and to discharge it adjacent to a slightly smaller diameter brakable end of this carrier; a row of series of radially extending relatively shallow concave fluid induction scoops integral internally with said clutchable end of said planet-gear-carrier adjacent the induction ends of said series of fluid impelling passages; a row of series of radially extending convex shaped fluid impelling vanes integral internally with said brakable end of said planet-gear-carrier; a row of series of through substantially axially extending fluid impelled passages located in said orbit-gear and forming cooperative communication between the discharge ends of said diagonally extending fluid impelling passages and said row of fluid impelling vanes; a row of series of elongated fluid impelled buckets located internally to the periphery of said annular shaped driven member and extending from adjacent said orbit-gear to adjacent the outward ends of said radially extending concaved shaped fluid induction scoops; and, a second row of series of through substantially axially extending fluid impelled passages, located outward radially from the first row of such and forming cooperative communication between the outward ends of said radially extending convex fluid impelling vanes and the adjacent ends of said row of elongated impelled buckets.

2. The coupler of claim 1 characterised by, wherein in lieu of the series of three of each of the first, second and third series of said pairs of tandem reduction planet-gears, a series of two such tandem pairs are provided for each such first, second and third series, with each series of two located 180° from each other and wherein there is a pair of such reduction planet-gears rotatively journalled within said planet-gear-carrier at each 60° of the latter, and, wherein the large diameter gears of the first series pairs mesh with said sun-gear, the large diameter gears of the second series pairs mesh with the small diameter gears of the first series pairs, the large diameter gears of the third series pairs mesh with the small diameter gears of the second series pairs, and the small diameter gears of the third series pairs mesh with said orbit-gear.

3. The coupler of claim 1 characterised by, wherein such type of coupler several automatically operable, equipped and provided, means are combined for producing progressive synchronization of the forward motion rotation of said carriers, namely; during the progressive rotation and driving of said sun-gear by said helical spline, of such one direction rotatable shaft, said planet-gear-carrier is thereby progressively rotated and simultaneously axially displaced and clutched against said clutching surface of said driven member; during such forward rotation of said plant-gear-carrier, a progressively increasing hydrodynamical pressure is generated within such coupler and tends to assist in such progressive clutching, and is the results of the combination of; said series of diagonally extending fluid impelling passages in said reduction planet-gears, both rows of said series of fluid impelled passages in said orbit-gear, said row of series of radially extending convex fluid impelling vanes in said planet-gear-carrier, said row of series of said elongated impelled buckets in the inner periphery of said annular shaped driven member, said row of series of radially extending concave fluid induction scoops in said planet-gear-carrier, the differential axial pressure thrust due to difference in diameters of the ends of said planet-gear-carrier, and, due to the relatively numerous reduction planet-gears, carried by said planet-gear carrier, inherently producing a hydrodynamical pressure within such coupler due to mass rotation; and, wherein such automatically operable means is combined with such variable fluid pressure means, operable manually externally and applicable internally to such coupler, for manually controlling such otherwise automatically operable progressive synchronization of said forward motion rotation and clutching of said carriers, and whereby such combinations, an extreme range of semi-automatically and manually controllable gearing ratio changes are provided, and which may extend from infinity rotation of said sun-gear and nil rotation of said driven member to one revolution of said sun-gear to one revolution of said driven member.

4. The coupler of claim 1 characterised by, wherein such type of coupler the reversing of the driven member thereof is normally accomplished by a combination of, equipped and provided, means comprising; said resilient coil spring for initially axially displacing said planet-gear-carrier against said braking surface of said stator-disc whenever the rotation of this carrier is at or below normal idling speed, means of applying said variable fluid pressure, operable manually externally and applicable internally to said coupler, for manually controlling the braking of said planet-gear-carrier against said braking surface of said stator-disc and thereby resulting in either slowing down and/or completely stopping the rotation of said planet-gear-carrier; and, whereby such combination, as combined with the quadruple compounding of planetary gearing as provided, results in the provision of an extreme range of manually controllable gearing ratio changes in reverse motion rotation of said driven member being made available to the operator, and wherein such range may extend from infinity forward rotation of said sun-gear to nil rotation of said driven member, to 32 forward revolutions of said sun-gear to one revolution in reverse motion of said driven member as an example.

5. The coupler of claim 1 characterised by, the quadruple compounding of, and as combined with the means described for producing hydrodynamic fluid flow within, such coupler, thereby forming a relatively simple and compact combination that results in an extremely wide range of semi-automatically operative and manually controllable gearing ratio changes being provided in this coupler both in the normal forward rotation of said driven member, as well as in the reverse rotation thereof in relation to the normal forward one direction rotation of said shaft and said sun-gear of such coupler.

6. The coupler of claim 1 characterised by, wherein such coupler the hydrodynamic fluid flow sequence thereof is as follows: from adjacent the clutchable end of the driven member the fluid is induced inward radially from the adjacent ends of the series of impelled buckets of said driven member by said row of series of concave shaped fluid induction scoops, it is then induced into the adjacent ends of said series of through fluid impelling passages in each of the larger diameter reduction planet-gears and discharged at the opposite ends thereof, such impelling passages through the first mentioned row of series of impelled passages in said orbit-gear into the adjacent row of said radially extending convex shaped fluid impelling vanes of said planet-gear-carrier, thence it is discharged through the second row of series of axially extending through impelled passages in said orbit-gear into the adjacent ends of said row of series of axially extending fluid impelled buckets in the inner periphery of said driven member, and, therethrough to the location of the starting of this fluid flow sequence.

7. The coupler of claim 1 characterised by, during the normal simultaneous rotation of the planet-gear-carrier and said series of reduction planet-gears and due to the fact that all of said larger diameter planet-gears are provided each with a series of through diagonally axially extending fluid impelling passages, a diagonally axially extending hydrodynamic fluid flow is generated within the coupler, and as combined with the difference in diameters of the two ends of said planet-gear-carrier results in a differential pressure axial displacement of this carrier towards and against said clutching surface in the closed end of said driven member, and which clutching tends to synchronize the rotation of the planet-gear-carrier with said driven member automatically.

8. The coupler of claim 1 characterised by, due to the fact that the planet-gear-carrier is variably clutched against the driven member at all forward motion rotative speeds above idling, excepting during such period when the driven member may be rotating faster than the planet-gear-carrier and results in the sun-gear driving said shaft and declutching said planet-gear-carrier due to helix of splines, such driven member cannot be reversed while so clutched, the application of fluid pressure to the coupler while said sun-gear is driving said shaft would result in braking the planet-gear-carrier against the stator-disc and would result in power braking of the coupler, while the application of such fluid pressure at or below idling speed rotation would result in reversing the direction of rotation of said driven member in relation to the direction of rotation of said sun-gear and shaft.

9. The coupler of claim 1 characterised by, due to the differential end areas formed by the clutching end of said planet-gear-carrier being of larger diameter than its brakable end, this carrier is displaced axially towards and is clutched against said clutching surface of said driven member as hydrodynamical pressure is progressively generated therein the latter during its progressive forward motion rotation, simultaneous with such rotation and progressive clutching and due to the helix angle of the splines of said shaft and sun-gear, a similar progressive clutching results and thus makes it possible to eliminate either one or the other of such two, clutch actuating, means as either one would be sufficient in itself to produce the necessary progressive clutching of such two carriers together during such progressive forward motion rotation of the coupler.

10. The coupler of claim 1 characterised by, due to the numerous means, with which such coupler is provided and equipped, for producing progressive hydrodynamic synchronization of the rotation of said carriers, and including the means for producing such synchronization by progressive clutching thereof, thus makes it possible to reduce the usual required width size and capacity of the fluid impelling vanes in such type of coupler, and thereby makes it possible to relatively reduce the overall width of such coupler accordingly.

11. The coupler of claim 1 characterised by, inasmuch as the over-running rotation of the driven member over the speed of rotation of the planet-gear-carrier would result in axially displacing the latter towards and braking it against said stator-disc, due to said sun-gear tending to drive said shaft at such time, and inasmuch as such braking would tend to power brake said shaft by tending to reverse its direction of rotation rather than to speed it up in its normal forward motion direction of rotation, such type of power braking cannot be relied upon for emergency purposes, so said driven member is therefore provided with unusually large diameter brake-shoe halves located in a brake-drum portion thereof and which shoes are jointly operated by a combined hydrodynamically and mechanically operable means.

12. In a combined hydrodynamical and compounded planetary gearing driven, externally manually controllable, fluid pressure variable and reversible transmission coupler equipped with; an internally splined, elongated, one direction rotatable shaft mounted, axially slidable and coaxially rotatable sun-gear forming the gearing driving member; an elongated halved type of coaxially slidable and rotatable combined fluid impeller and planet-gear-carrier forming the hydrodynamical driving and intermediate member; an annular shaped, elongated, halved type of concentrically rotatable multi-bucketed combined closed fluid receptacle casing, orbit-gear-carrier and traction wheel hub forming the gearing and hydrodynamically driven member and provided with a clutching surface internal to one end thereof; an elongated flanged tubular stator member projecting a predetermined distance concentrically within said driven member and upon and within which respectively said driven member and said shaft are concentrically rotatively journalled; an annular shaped flanged stator-disc secured over the coupler end of said stator member and provided with a braking surface on one side thereof; an elongated resilient coil spring mounted over said shaft and provided for initially displacing said planet-gear-carrier against said braking surface of said stator-disc; means for progressively clutching said carriers together for synchronizing their normal forward motion rotation; an orbit-gear secured to and carried by said orbit-gear-carrier; a brake-drum forming an external portion of said driven member and provided with combined hydraulically and mechanically operable brake-shoe halves; and, a variable fluid pressure means operable manually externally and applicable internally to such coupler for controlling the forward and reverse rotation of the driven member thereof, the combination therein and therewith of: means for quadruple compounding the planetary gearing of, as combined with means for producing hydrodynamic fluid flow circulation within such coupler, comprising; at least two pairs of each, of three series of similar tandem pairs of elongated reduction planet-gears each provided with a relatively large diameter planet-gear at one end and a relatively small diameter planet-gear at the opposite end thereof, and wherein the two pairs of each series are located 180° from each other and there is a tandem pair of such reduction planet-gears rotatively journalled within said planet-gear-carrier at each 60° of the latter, and wherein the larger diameter gears of the two pairs of the first series mesh with said sun-gear, the larger diameter gears of the two pairs of the second series mesh with the smaller diameter gears of the first series, the larger diameter gears of the two pairs of the third series mesh with the smaller diameter gears of the second series, and the smaller diameter gears of the third series mesh with said orbit-gear, and wherein the latter forms the last gear of such quadruple compounding and normally rotates in the same direction as said sun-gear but may be reversed in relation thereto by a predetermined slowing down or stopping of the planet-gear-carrier during its normal rotation, and, wherein each of the larger diameter reduction planet-gears is provided with a series of through diagonally axially extending fluid impelling passages which latter, during the rotation of such planet-gears, are each provided to induce fluid from adjacent a relatively large diameter clutchable end and to discharge it adjacent to a relatively small diameter brakable end of said planet-gear-carrier; and, further means for producing hydrodynamic fluid flow circulation within such coupler as combined with such series of fluid impelling passages producing such fluid flow, comprising; a row of series of radially extending concaved shaped fluid induction scoops integral internally with said clutchable end of said planet-gear-carrier adjacent the induction ends of said series of fluid impelling passages, a row of series of radially extending convexed shaped fluid impelling vanes integral internally with said brakable end of said planet-gear-carrier adjacent the discharge ends of said series of fluid impelling passages, a row of series of through substantially axially extending fluid impelling fluid impelled passages located in said orbit-gear and forming cooperative communication between the discharge ends of said fluid impelling passages and said row of series of fluid impelling vanes, a row of series of elongated axially extending fluid impelled buckets located internally to the periphery of said annular shaped driven member and extending from adjacent said orbit-gear to adjacent to the outward ends of said radially extending concaved shaped fluid induction scoops, and, a second row of series of through substantially axially extending fluid impelled passages, located outward radially from the first row of such, forming cooperative communication between the outward ends of said radially extending convexed shaped fluid impelling vanes and the adjacent ends of said row of elongated axially extending fluid impelled buckets.

13. The coupler of claim 12 characterised by, wherein during the normal forward motion rotation of the two carriers of such coupler, several means are combined for synchronizing the rotation of these carriers, namely: the clutchable end of said planet-gear-carrier being of larger diameter than its brakable end, results in differential end areas being formed relative to the two ends of this carrier and wherein any pressure applied hydrodynamically within such carrier will displace it axially towards its larger diameter clutchable end and will result in such carrier being clutched against the clutching surface of said driven member according to the pressure being applied; the induction of fluid from adjacent the clutchable end of said planet-gear-carrier by both said row of series of concaved shaped fluid induction scoops and each of said series of through diagonally axially extending fluid impelling passages acting jointly with said row of series of radially extending convex shaped fluid impelling vanes for discharging such fluid radially outward adjacent the brakable end of this carrier, tend to axially displace and to clutch said planet-gear-carrier against said driven member according to the hydrodynamic pressure progressively generated during the rotation of such planet-gear-carrier; due to the mass rotation of the relatively numerous reduction planet-gears carried by said planet-gear-carrier as combined with the progressive rotation of the two carriers inherently producing a progressive hydrodynamical pressure within said driven member which tends to axially displace and to progressively clutch said planet-gear-carrier against said driven member; due to the fact that the fluid flow through said row of series of elongated axially extending fluid impelled buckets is from adjacent said orbit gear carrier to adjacent the clutchable end of said planet-gear-carrier, the latter is progressively axially displaced by such flow and is axially clutched against said driven member; and, wherein the former, which consist substantially of automatically applicable means, are further combined with such manually operable variable fluid pressure means for applying fluid pressure internally to such coupler for manually controlling and/or bolstering such automatically applicable means.

14. The coupler of claim 12 characterized by, wherein such coupler combination, the reversing of the driven member thereof is normally accomplished by a combination of means comprising: said resilient coil spring which initially places said planet-gear-carrier braked slightly against said stator-disc at idling speeds or below; and, such manually operable variable fluid pressure means for applying fluid pressure internally to such coupler for manually bolstering such initial braking of said planet-gear-carrier against said stator disc and thereby resulting in this carrier being either slowed down and/or stopped in its rotation and thus resulting in a variable reversing of said driven member; and whereby such combination, as combined with the quadruple compounding of the planetary gearing of such coupler, results in an extreme range of manually controllable gearing ratio changes being provided in the reverse motion rotation of said driven member, and which range may extend from infinity rotation forward of said sun-gear to nil rotation of said driven member, to 32 forward motion revolutions of said sun gear to one reverse revolution of said driven member as an example.

15. The coupler of claim 12 characterized by, the quadruple compounding of, and as combined with the means described for producing hydrodynamic fluid flow within, such coupler, thereby forming a relatively simple and compact combination that results in an extremely wide range of semi-automatically operative manually controllable gearing ratio changes being provided therein, both in the normal forward motion rotation as well as in the reverse motion rotation of the driven member thereof such coupler, and, as further combined with such manually operable variable fluid pressure means for applying fluid pressure internally to such coupler for bolstering the hydrodynamical fluid pressure generated therein, during the progressive rotation of the planet-gear-carrier, and for controlling such coupler, the latter may be made variable in its forward motion rotation over a range extending from infinity rotation of said sun-gear to nil rotation of said driven member, and from one revolution of said sun-gear to one revolution of said driven member.

16. The coupler of claim 12 characterized by, during the normal simultaneous rotation of the planet-gear carrier and said series of reduction planet-gears and due to the fact that all of the larger diameter gears are provided each with a series of through diagonally axially extending fluid impelling passages, a diagonally axially extending hydrodynamic fluid flow is generated within the coupler, and as combined with the differential means provided, by the difference in diameters of the two ends of said planet-gear-carrier, a differential pressure axial displacement and clutching of such planet-gear-carrier against said driven member results, and which clutching tends to synchronize the rotation of the two carriers automatically.

17. The coupler of claim 12 characterised by, due to the fact that the planet-gear-carrier is variably clutched against the orbit-gear-carrier at all forward motion rotative speeds above idling, the coupler cannot be accidently reversed at any forward motion speed above idling, however at and below idling speeds of rotation the driven member may be reversed by manually applying said variable fluid pressure.

18. The coupler of claim 12 characterised by, the hydrodynamic fluid flow sequence thereof is as follows: from adjacent the clutchable end of the carriers the fluid is induced inward radially from adjacent the row of series of impelled buckets by said row of series of radially extending concave shaped fluid induction scoops, it is then induced into the adjacent ends of said series of through fluid impelling passages in each of the larger diameter reduction planet-gears and discharged at the opposite ends thereof such impelling passages jointly, through the first mentioned row of series of impelled passages in said orbit-gear, and directly into the adjacent row of series of radially extending convex shaped fluid impelling vanes of said planet-gear-carrier, thence it is discharged through the second mentioned row of series of axially extending through impelled passages in said orbit-gear into the adjacent ends of said row of series of fluid impelled buckets, and, therethrough the latter to the location of starting of this fluid flow sequence.

19. The coupler of claim 12 characterised by, due to the numerous means, with which such coupler is provided and equipped, for producing progressive hydrodynamic synchronization of the rotation of said carriers, and including the means for progressively clutching such carriers together, thus makes it possible to relatively reduce the capacity of the usual fluid induction scoops and vanes of such coupler by providing them of relatively narrow or shallow widths, and thereby to relatively reduce the overall width of the coupler accordingly.

20. The coupler of claim 12 characterised by, wherein such coupler it is impossible to shift into a lower gearing ratio manually for power braking by causing said shaft and sun-gear to rotate at a relatively higher rate of speed than the driven member in the forward motion rotation, and by reason of which fact such coupler is provided with an unusually large capacity brake-drum, forming a part of said driven member and provided with a pair of internal brake-shoes, that for safety purposes are simultaneously hydraulically and mechanically operable.

21. In a combined hydrodynamical and compounded planetary gearing driven transmission coupler equipped with; a shaft-mounted coaxially rotatable sun-gear forming the gearing driving member; a coaxially rotatable, annular shaped, elongated combined fluid impeller and planet-gear-carrier forming the hydrodynamical driving and intermediate member; a concentrically rotatable, annular shaped, elongated combined closed fluid receptacle casing and orbit-gear-carrier forming the gearing and hydrodynamically driven member; and, an annular shaped orbit-gear rotatable concentrically with such orgit-gear-carrier, the provision therein and therewith of means for quadruple compounding, the otherwise compounded, planetary gearing of such coupler, comprising: at least two pairs of each, of three series of similar tandem pairs of elongated reduction planet-gears each provided with a relatively large diameter planet-gear at one end and a relatively small diameter planet-gear at the opposite end thereof, and wherein the two pairs of each series are located 180° from each other and there is a tandem pair of such reduction planet-gears rotatively journalled within said planet-gear-carrier at each 60° of the latter, and wherein the larger diameter gears of the two pairs of the first series mesh with said sun-gear, the larger diameter gears of the two pairs of the second series mesh with the smaller diameter gears of the first series, the larger diameter gears of the two pairs of the third series mesh with the smaller diameter gears of the second series, and the smaller diameter gears of the third series mesh with said orbit-gear and wherein the latter forms the last gear of such compounding and normally rotates in the same direction as said sun-gear.

22. In a combined hydrodynamical and planetary gearing driven transmission coupler equipped with; a shaft-mounted coaxially rotatable sun-gear forming the gearing driving member; a coaxially rotatable, annular shaped combined fluid impeller and planet-gear-carrier forming the gearing and hydrodynamical driving and intermediate member; a series of relatively large diameter planet-gears symmetrically spaced and rotatively journalled within said planet-gear-carrier; a concentrically rotatable, annular shaped, elongated, combined closed fluid receptacle casing and orbit-gear-carrier forming the gearing and hydrodynamically driven member; an annular shaped orbit-gear rotatable concentrically therewith said orbit-gear-carrier; and, a relatively large diameter clutchable end and relatively small diameter opposite brakable end forming differential end areas upon said planet-gear-carrier, the provision therein and therewith of: means providing each of said planet-gears with a row of series of symmetrically spaced diagonally axially extending fluid impelling passages wherein each are provided, during the rotation of said planet-gears, to induce fluid from adjacent the larger diameter end and to discharge it to adjacent the smaller diameter end of said planet-gear-carrier, and, to thereby axially displace this carrier towards its larger diameter end and to clutch it against said driven member.

No references cited.